(12) United States Patent
Vrbas

(10) Patent No.: US 7,571,607 B2
(45) Date of Patent: Aug. 11, 2009

(54) TWO-SHAFT TURBOCHARGER

(75) Inventor: Gary D. Vrbas, Wilmington, CA (US)

(73) Assignee: Honeywell International Inc., Morristown, NJ (US)

(*) Notice: Subject to any disclaimer, the term of this patent is extended or adjusted under 35 U.S.C. 154(b) by 71 days.

(21) Appl. No.: 11/368,651

(22) Filed: Mar. 6, 2006

(65) Prior Publication Data

US 2007/0204615 A1 Sep. 6, 2007

(51) Int. Cl.
*F02B 33/44* (2006.01)

(52) U.S. Cl. .......................... 60/605.1; 415/69

(58) Field of Classification Search .............. 415/103, 415/69, 199.5, 65, 66, 68, 150, 149.2, 149.4, 415/155, 199.6, 598, 605.1, 607, 608, 612, 415/624; 417/407
See application file for complete search history.

(56) References Cited

U.S. PATENT DOCUMENTS

| | | | | |
|---|---|---|---|---|
| 2,349,427 A | * | 5/1944 | Heimerich | 378/59 |
| 2,839,005 A | * | 6/1958 | Means | 417/247 |
| 2,842,306 A | | 7/1958 | Buchi | |
| 3,143,103 A | * | 8/1964 | Zuhn | 60/599 |
| 3,703,081 A | * | 11/1972 | Krebs et al. | 60/226.1 |
| 4,155,684 A | * | 5/1979 | Curiel et al. | 417/409 |
| 4,619,590 A | * | 10/1986 | Johnson | 417/407 |
| 4,815,935 A | * | 3/1989 | Gottemoller | 415/211.1 |
| 5,011,371 A | * | 4/1991 | Gottemoller | 415/211.1 |
| 5,025,629 A | | 6/1991 | Woollenweber | |
| 5,081,832 A | | 1/1992 | Mowill | |
| 5,105,616 A | * | 4/1992 | Bornemisza | 60/804 |
| 5,176,508 A | | 1/1993 | Mirville | |
| 5,323,612 A | | 6/1994 | Werner | |
| 5,692,372 A | * | 12/1997 | Whurr | 60/226.1 |
| 5,996,348 A | | 12/1999 | Watkins | |
| 6,305,169 B1 | | 10/2001 | Mallof | |
| 7,150,152 B2 | * | 12/2006 | Kilkenny et al. | 60/612 |
| 2006/0086090 A1 | | 4/2006 | Kilkenny et al. | |
| 2007/0125083 A1 | * | 6/2007 | Rollinger et al. | 60/605.1 |

FOREIGN PATENT DOCUMENTS

| | | |
|---|---|---|
| GB | 586553 | 12/1942 |
| GB | 1510070 | 10/1976 |
| GB | 2260373 | 4/1993 |
| GB | 2349427 | 1/2000 |

(Continued)

OTHER PUBLICATIONS

PCT ISR PCT/US07/063144.

*Primary Examiner*—Thomas Denion
*Assistant Examiner*—Douglas J. Duff
(74) *Attorney, Agent, or Firm*—John Griecci

(57) ABSTRACT

A turbocharger, having an axial compressor wheel and an axial turbine wheel mounted on a first shaft supported by a housing, and a radial compressor wheel and a radial turbine wheel mounted on a second shaft, the second shaft concentrically extending around the first shaft and being supported by the housing. The housing defines a first duct extending axially from the exducer of the axial compressor to the inducer of the radial compressor, and a second duct extending axially from the exducer of the radial turbine to the inducer of the axial turbine. A plurality of controllable compressor guide vanes extend through the first duct, and a plurality of controllable turbine stator vanes extend through the second duct. The housing is provided with variable diffuser vanes at the exducer of the radial compressor, and with variable turbine vanes at the inducer of the radial turbine. The variable turbine vanes and the turbine stator vanes are controlled to accurately control the rotation rate of the radial and axial turbines. The compressor guide vanes are controlled to minimize surge and maximize choke flow rate.

34 Claims, 4 Drawing Sheets

FOREIGN PATENT DOCUMENTS

| | | |
|---|---|---|
| GB | 2349427 | 1/2001 |
| JP | 60116821 | 6/1985 |
| JP | 60116821 | 6/1986 |
| WO | 2004101969 | 11/2004 |

\* cited by examiner

TWO-SHAFT TURBOCHARGER

The present invention relates generally to compressors for turbomachinery and, more particularly, to apparatus and methods of operating a two-shaft turbocharger.

BACKGROUND OF THE INVENTION

Turbochargers are used in a variety of applications for providing compressed gas for the operation of an internal combustion engine. As an example, with reference to FIG. 1, a turbocharger 101 includes a turbocharger housing and a rotor configured to rotate within the turbocharger housing along an axis of rotor rotation 103 on thrust bearings and journal bearings. The turbocharger housing includes a turbine housing 105, a compressor housing 107, and a bearing housing 109 that connects the turbine housing to the compressor housing. The rotor includes a turbine wheel 111 located substantially within the turbine housing, a compressor wheel 113 located substantially within the compressor housing, and a shaft 115 extending along the axis of rotor rotation, through the bearing housing, to connect the turbine wheel to the compressor wheel.

The turbine housing 105 and turbine wheel 111 form a turbine configured to circumferentially receive a high-pressure exhaust gas stream 121 from an exhaust manifold 123 of an internal combustion engine 125. The turbine wheel (and thus the rotor) is driven in rotation around the axis of rotor rotation 103 by the high-pressure exhaust gas stream, which becomes a lower-pressure exhaust gas stream 127 and is axially released into an exhaust system (not shown).

The compressor housing 107 and compressor wheel 113 form a compressor. The compressor wheel, being driven in rotation by the exhaust-gas driven turbine wheel 111, is configured to compress axially received ambient air 131 into a pressurized air stream 133 that is ejected circumferentially from the compressor. The pressurized air stream is characterized by an increased temperature, over that of the ambient air, due to the compression process, but may be channeled through a convectively cooled charge air cooler 135 configured to dissipate heat from the pressurized air stream, and thereby increase its density. The resulting cooled and pressurized air stream 137 is channeled into an intake manifold 139 on the internal combustion engine.

Numerous modern turbocharger applications have increased pressure ratio and flow range requirements due to the use of exhaust gas recirculation ("EGR") to reduce emissions, and due to the need for higher engine torque and power ratings. Because conventional single-stage turbochargers have difficulty meeting these requirements, turbochargers are now being connected in series to meet these requirements. An arrangement of in-series turbochargers may add significant size, weight and cost to the overall cost of an internal combustion engine. Additionally, in-series turbochargers must be interconnected by interstage ducting, which can slow overall response time.

Another solution to the need for increased pressure ratio and flow range requirements is the Low Speed Turbocharger ("LST"), which uses two radial compressor wheels on a shaft connected to a single radial turbine. A challenge in designing an LST turbine is that it must provide the required power to efficiently drive both compressors, while having a sufficiently low rotational inertia so as to operate comparably with series turbochargers in terms of transient response.

Accordingly, there has existed a need for a turbocharger apparatus and related methods to provide an increased pressure ratio and an extended flow range, while minimizing cost, size, weight and response time. Preferably these apparatus and related methods provide for accurate control of EGR flow rate over a broad range of engine and compressor operating points, while minimizing engine back-pressure, and thus reducing engine pumping losses. Preferred embodiments of the present invention satisfy these and other needs, and provide further related advantages.

SUMMARY OF THE INVENTION

In various embodiments, the present invention solves some or all of the needs mentioned above, typically providing a two-shaft turbocharger system that provide an increased pressure ratio and an extended flow range, while minimizing cost, size, weight and response time. Preferably these apparatus operate to accurately control EGR flow rate over a broad range of engine and compressor operating points, and minimize engine back-pressure to reduce engine pumping losses.

The invention typically provides a turbocharger system having a first compressor wheel and a first turbine wheel mounted on a first shaft supported by a housing, and a second compressor wheel and a second turbine wheel mounted on a second shaft supported by the housing. The first and the second shafts extend concentrically to define an axial direction, and the housing defines a duct extending axially between the first and second compressor wheels. The first compressor wheel is an axial compressor wheel configured to direct airflow axially through the axial duct toward the second compressor wheel when the first turbine is being driven by exhaust gas.

Advantageously, the first axial compressor directing air into the axial duct provides for a responsive, low-pressure compressor providing pressurized air into a second compressor, wherein the duct has a limited volume so as to improve transient response time. Additionally, the axial compressor can be used at low boost levels to generate swirl entering the second compressor, which can minimize incidence on the second compressor wheel's blades, so as to provide a greater low-flow (surge) flow range than might be possible with a single stage compressor, thereby increasing the flow range on the low-flow side of the turbocharger's compressor map. This greater flow range can be accomplished without the pressure loss, and related inefficiency loss, which would occur due to the use of inlet guide vanes. Furthermore, because the axial compressor will increase the density of the air entering the second compressor, the high-flow (choke) flow rate will increase, thereby increasing the flow range on the high-flow side of the turbocharger's compressor map.

The invention typically further features that the housing defines a second axial duct that extends between the first and second turbine wheels, and that the second turbine wheel is a radial turbine wheel configured to direct airflow axially through the second axial duct toward the first turbine wheel. Advantageously, the second radial turbine directing air into the second axial duct provides for a responsive, low-pressure turbine to receive pressurized exhaust from the radial turbine, wherein the duct has a limited volume to improve transient response time.

The invention further features the use of vanes within the first and second axial ducts. The vanes preferably have a controllable geometry, and there is a control system providing for accurate and individual control over the speed of each turbine, and providing for improved surge and choke characteristics.

Other features and advantages of the invention will become apparent from the following detailed description of the preferred embodiments, taken with the accompanying drawings, which illustrate, by way of example, the principles of the invention. The detailed description of particular preferred embodiments, as set out below to enable one to build and use an embodiment of the invention, are not intended to limit the enumerated claims, but rather, they are intended to serve as particular examples of the claimed invention.

DETAILED DESCRIPTION OF THE PREFERRED EMBODIMENTS

The invention summarized above and defined by the enumerated claims may be better understood by referring to the following detailed description, which should be read with the accompanying drawings. This detailed description of particular preferred embodiments of the invention, set out below to enable one to build and use particular implementations of the invention, is not intended to limit the enumerated claims, but rather, it is intended to provide particular examples of them.

Figure 1:
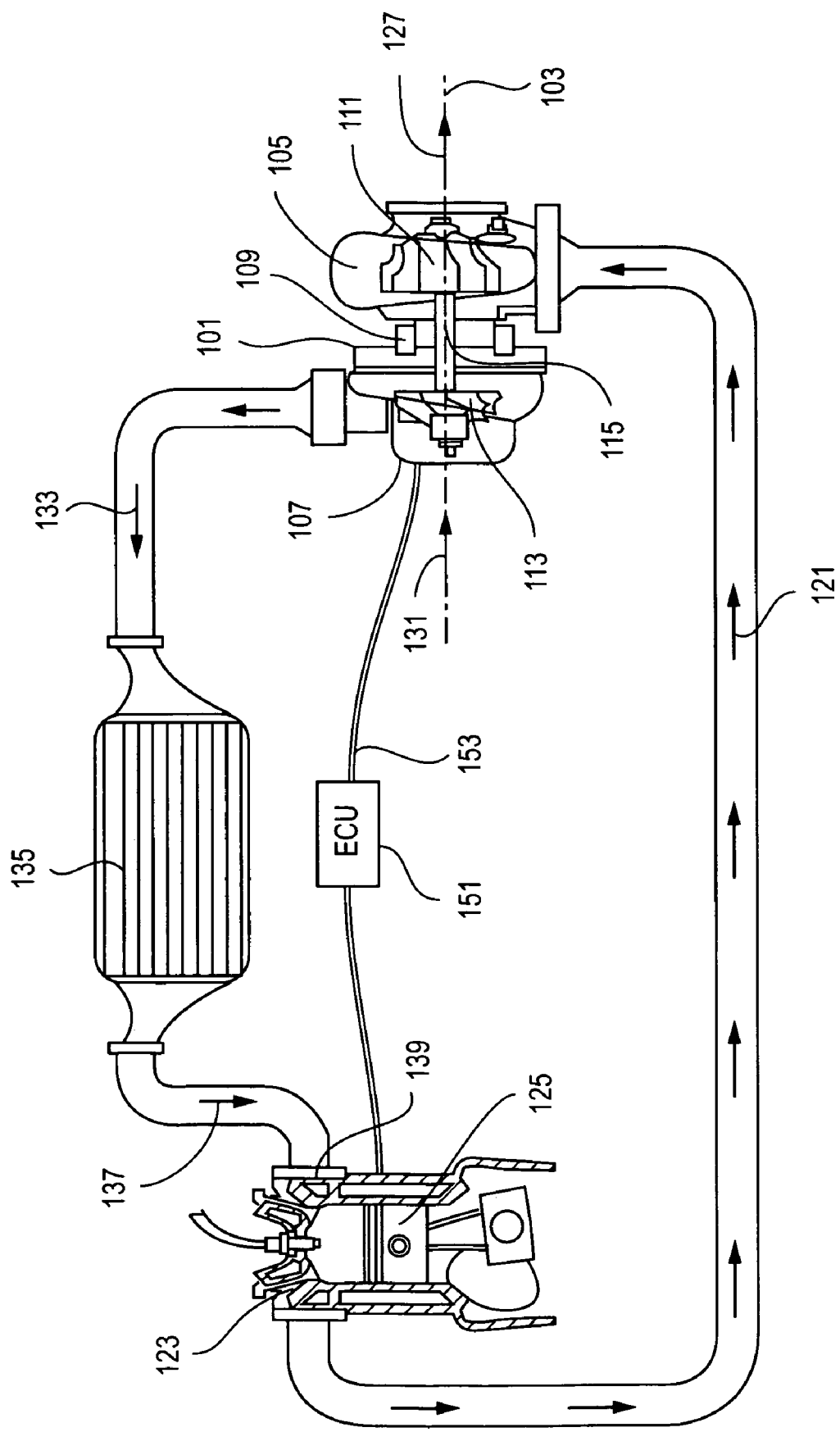
FIG. 1 is a schematic layout of an internal combustion engine with a turbocharger and a charge air cooler under the present invention.
Figure 2:
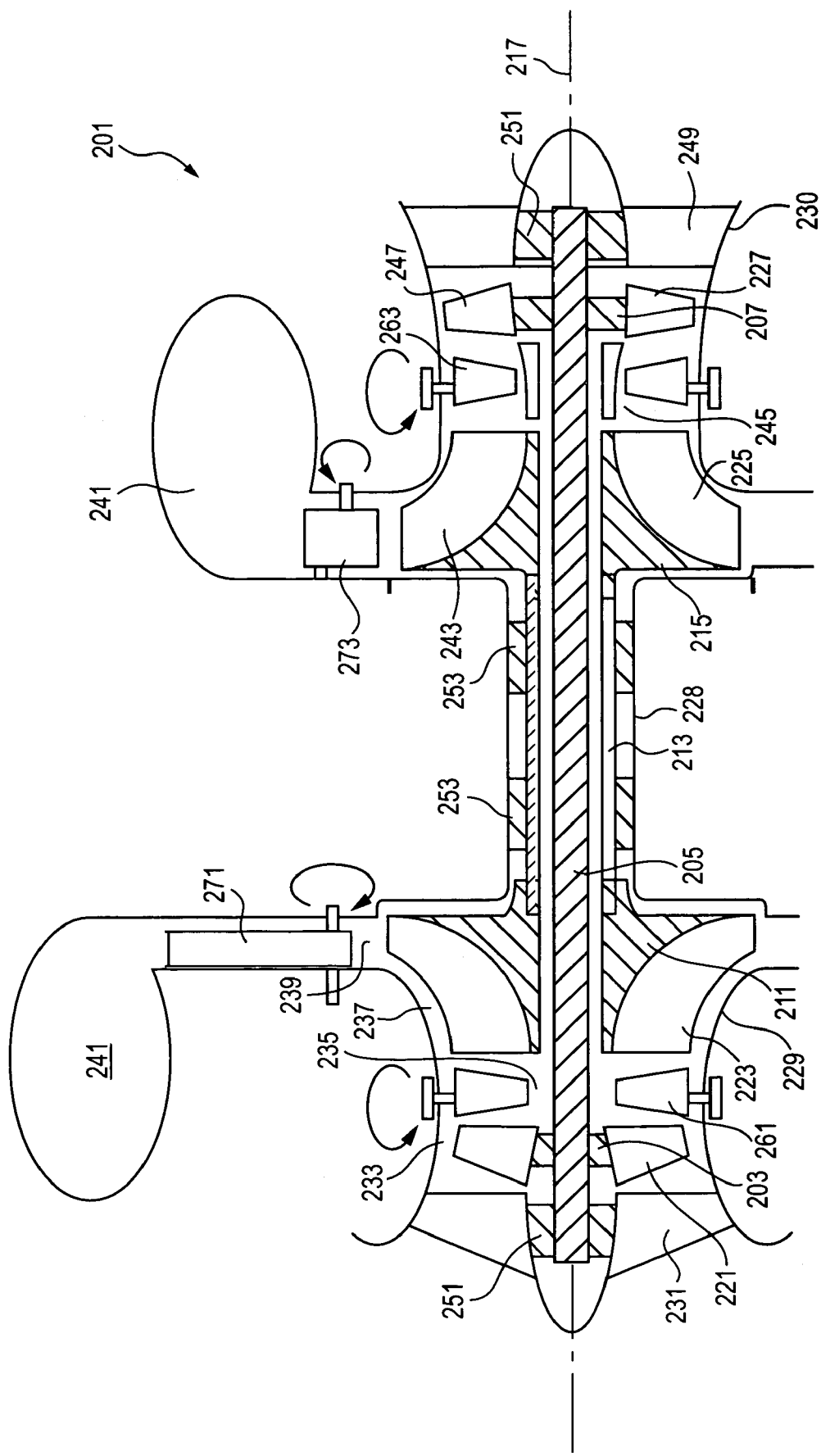
FIG. 2 is a conceptual cross-section view of a turbocharger embodying the present invention.

Typical embodiments of the present invention reside in a dual shaft axial-radial turbocharger, along with associated methods and apparatus. With reference to FIG. 2, a turbocharger 201 under the present invention is usable with an internal combustion engine in a fashion similar to a typical turbocharger, as described with reference to FIG. 1. The turbocharger includes a first, inner rotor, including a first-stage, low-pressure, axial compressor wheel 203, an inner shaft 205, and a second-stage, low-pressure, axial turbine wheel 207. It further includes a second, outer rotor, including a second-stage, high-pressure, radial compressor wheel 211, an outer shaft 213, and a first-stage, high-pressure, radial turbine wheel 215. The inner shaft concentrically extends through the outer shaft in an axial direction defined by a common axis of rotation 217 for both rotors.

Each compressor wheel and turbine wheel includes a plurality of blades that define an inducer (i.e., an intake end of the combined set of blades while rotating) and an exducer (i.e., an output end of the combined set of blades while rotating). The first-stage, low-pressure axial compressor wheel 203 includes a plurality of axial compressor blades 221 (i.e., impellers) that define a typically circular inducer and a typically circular exducer. The second-stage, high-pressure radial compressor wheel 211 includes a plurality of radial compressor blades 223 (i.e., impellers) that define a typically circular inducer and a typically annular exducer. The first-stage, high-pressure, radial turbine wheel 215 includes a plurality of radial turbine blades 225 that define a typically annular inducer and a typically circular exducer. The second-stage, low-pressure, axial turbine wheel 207 includes a plurality of axial turbine blades 227 that define a typically circular inducer and a typically circular exducer.

The turbocharger also includes a housing configured to house the inner and outer rotors. The housing includes several portions, including a bearing housing 228, a compressor housing 229, and a turbine housing 230. The compressor housing forms and air passageway, serially including an intake duct 231 leading axially into the axial compressor inducer, an axial compressor impeller passage 233 leading from the axial compressor inducer to the axial compressor exducer and substantially conforming to the space through which the axial compressor blades rotate, a compressor-connection duct 235 leading axially from the axial compressor exducer into the radial compressor inducer, a radial compressor impeller passage 237 leading from the radial compressor inducer to the radial compressor exducer and substantially conforming to the space through which the radial compressor blades rotate, a diffuser 239 leading radially outward from the exducer, and a volute 241 extending around the diffuser.

The compressor volute forms a scroll shape, and leads to an outlet port through which the pressurized air stream is ejected circumferentially (i.e., normal to the circumference of the scroll at the exit) as the pressurized air stream that passes to the (optional) charge air cooler and intake manifold. As is typical in automotive applications, the intake duct 231 is fed a stream of filtered external air from an intake passage in fluid communication with the external atmosphere. Each portion of the passage is in fluid communication with the next.

The turbine housing 230 forms an air passageway, serially including a turbine inlet volute 241 leading radially into the radial turbine inducer, a radial turbine impeller passage 243 leading from the radial turbine inducer to the radial turbine exducer and substantially conforming to the space through which the radial turbine blades rotate, a turbine connection duct 245 leading axially from the radial turbine exducer into the axial turbine inducer, an axial turbine impeller passage 247 leading from the axial turbine inducer to the axial turbine exducer and substantially conforming to the space through which the axial turbine blades rotate, and a discharge duct 249 leading axially outward from the axial turbine exducer.

The turbine volute forms a scroll shape, and received exhaust gas from the exhaust manifold. As is typical in automotive applications, the discharge duct discharges passing air into an exhaust system. Each portion of the passage is in fluid communication with the next.

The inner shaft 205 is supported by the compressor and turbine housings on a first plurality of bearings 251, typically being located outboard of the low-pressure compressor and turbine wheels, 203 and 207, at both ends of the inner shaft, respectively. The outer shaft 213 is supported by the bearing housing on a second plurality of bearings 253, typically located intermediate the high-pressure compressor and turbine wheels, 211 and 215. The inner-shaft and outer-shaft bearings are either floating or semi-floating journal type bearings or ball bearings. Optionally, bearings contained within the same bearing housing as used for the outer shaft may also be used for the inner shaft. The bearings are all supported, either directly or indirectly, by the housing. The bearing system includes a suitable lubrication system using known technology. The two shafts rotate independently and thus their relative speeds may very.

Except as otherwise discussed, in operation an embodiment of the present invention may operate in a fashion similar to in-series turbochargers. At low speeds surge flow is governed by the axial compressor, which can operate at lower flow rates than a radial compressor. During engine acceleration, turbocharger boost will initially be provided by primarily spooling up the low-pressure, inner rotor, which will normally have a low rotational inertia (typically lower than that of a Low Speed Turbocharger or either of the two turbochargers in an in-series turbocharger system). The low rotational inertia minimizes the level of kinetic energy stored by the rotating inner rotor, and therefore minimizes the response time to achieve low-end boost. Also contributing to favorable transient response over other multiple-compression type turbocharger systems is the limited volume contained within the interstage ducting (e.g., the compressor-connection duct) as compared to: in-series turbochargers with more ducting. At high speeds the axial compressor increases the air pressure and density entering the radial compressor, which increases the choke flow rate.

As an alternative to in-series turbochargers, the present invention appears to offer substantially improved packaging (including smaller overall size and weight) and lower costs of manufacture. Additionally, an embodiment of the present invention is believed to provide broader compressor flow range than a comparable Low Speed Turbocharger, as well as a lower transient response time, which may be comparable to or better than the transient response performance achieved by in-series turbochargers. This is all accomplished while providing a high compressor-pressure-ratio capability.

The compressor-connection duct 235 may include a plurality of compressor guide vanes 261. While the compressor guide vanes may be stationary, they are preferably of a variable, controllable geometry (e.g., they may be controllably pivoted about a radial axis perpendicular to the rotor axis of rotation 217), providing control over the airflow between the two compressors. More particularly, preferably the compressor guide vanes are actuated by an actuator that is controllably directed by a controller so as to transition the functionality of the axial, low-pressure compressor from a swirl generator for low-flow conditions to a boost enhancing device for high-flow conditions.

Similarly, the turbine-connection duct.245 may include a plurality of turbine stator vanes 263. While the turbocharger stator vanes may be stationary, they are preferably of a variable, controllable geometry (e.g., they may be controllably pivoted about a radial axis perpendicular to the rotor axis of rotation 217), providing control over the airflow between the two turbines.

Figure 3:
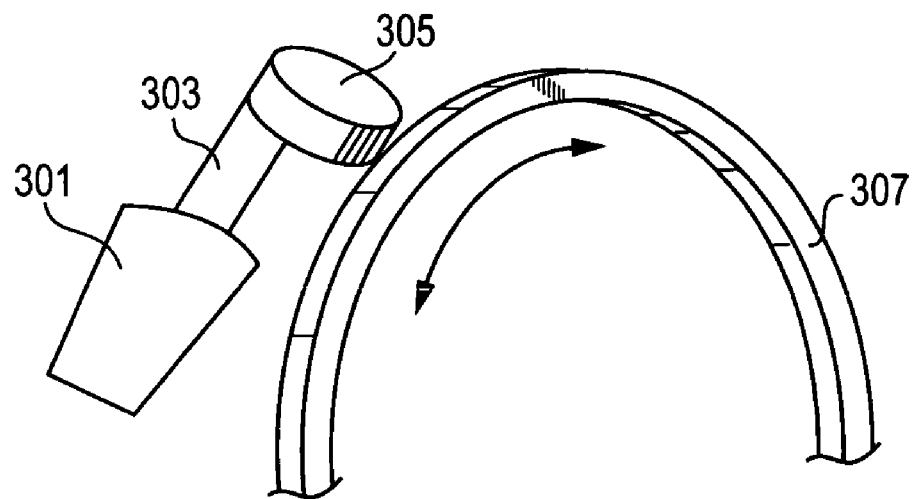
FIG. 3 is a partial conceptual view of a compressor guide vane apparatus or turbine stator vane apparatus, along with an associated ring gear unison ring for use in the turbocharger depicted in FIG. 2.
Figure 4:
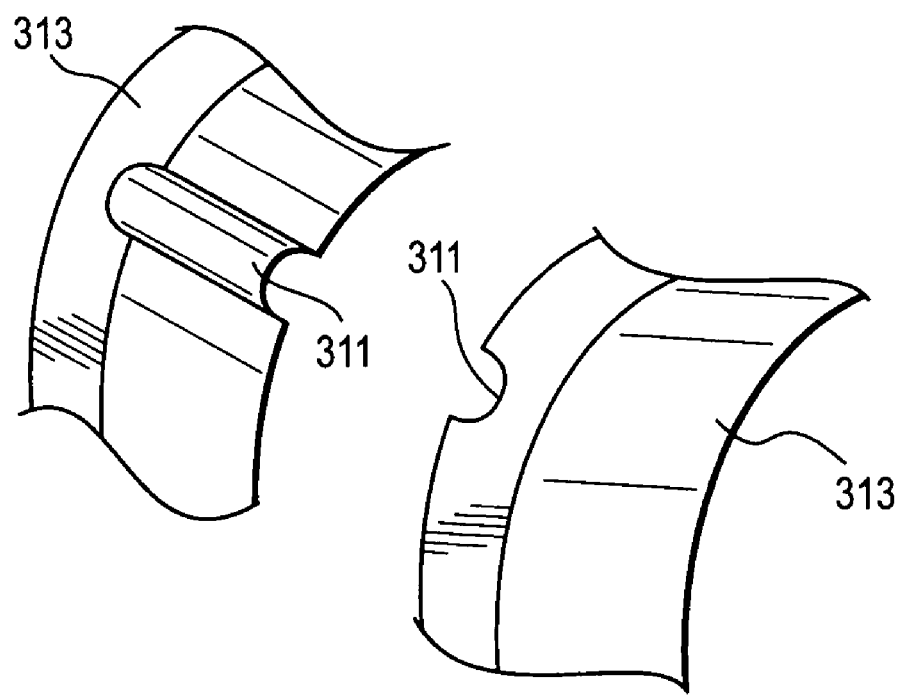
FIG. 4 is a partial view of two associated split bearing rings for use with the compressor guide vane apparatus or turbine stator vane apparatus depicted in FIG. 3.

With reference to FIGS. 3 and 4, the variable geometry compressor guide vanes and the variable geometry turbine stator vanes are each preferably single-piece vanes 301 carried on a radially extending shaft 303 (with reference to the rotors) that connects to a geared disk 305 that is concentric with the common axis of rotation 217 (FIG. 2). The shaft of each compressor guide vane and each turbine stator vane is supported between grooves 311 in two split bearing rings 313, providing for each compressor guide vane and each turbine stator vane to rotate along a longitudinal axis of its respective shaft. The vanes are driven in rotation by a ring gear unison ring 307 that is cooperatively geared to drive each disk, and the ring gear unison ring is part of a circular actuation system, as is known for vane actuation in turbocharger technology.

The use of variable compressor guide vanes therefore allows an engine controller to increase the flow range of the compressor. At low speeds, the compressor guide vanes are preferably adjusted to direct the flow into the second stage wheel in a swirling direction compatible with the angle of the second stage compressor blades, thereby minimizing surge flow. At high speeds, the compressor guide vanes are preferably adjusted to direct the flow into the second stage compressor wheel in an axial or near-axial direction, to maximize choke flow capacity.

Figure 5:
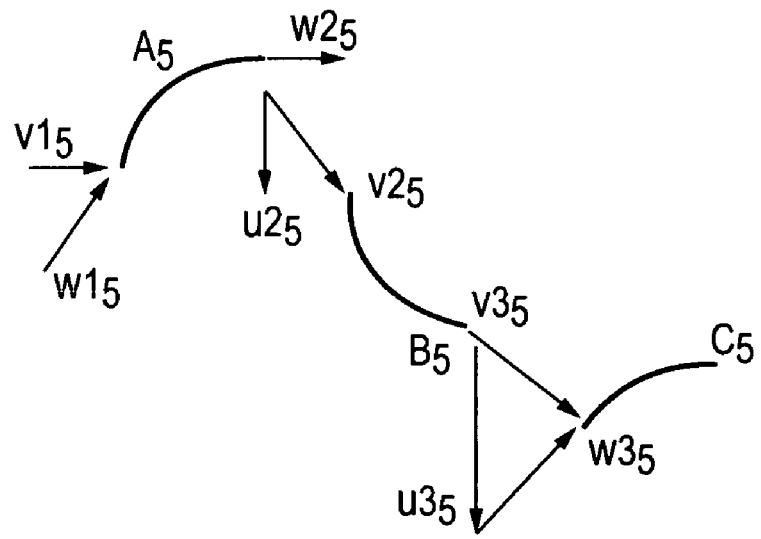
FIG. 5 diagrams relative and absolute airflow for a low-speed/low-flow case of a first and second stage compressor wheel blade in the turbocharger depicted in FIG. 2.
Figure 6:
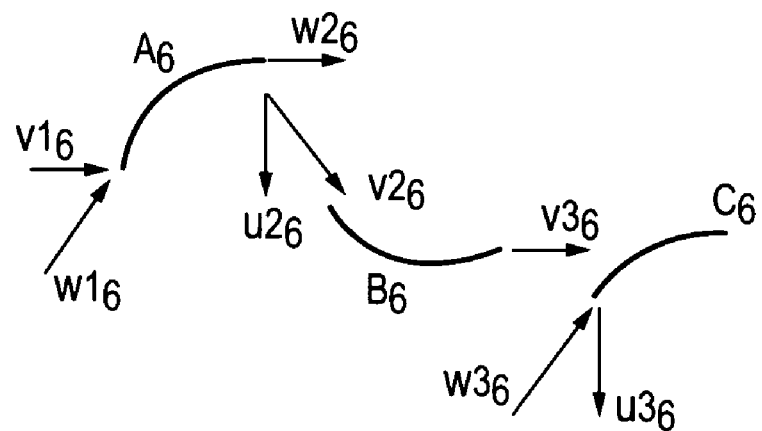
FIG. 6 diagrams relative and absolute airflow for a high-speed/high-flow case of a first and second stage compressor wheel blade in the turbocharger depicted in FIG. 2.

More particularly, with reference to FIGS. 5 (representing low-speed/low-flow cases) and 6 (representing high-speed/hi-flow cases), low-speed/low-flow inlet airflow at absolute velocity $v1_5$ is received at first stage compressor blade $A_5$ (which is moving at velocity $u2_5$) with a relative wind speed of $w1_5$. The airflow departs the first stage compressor blade at relative wind speed $w2_5$ and an absolute velocity of $v2_5$. The compressor guide vanes $B_5$ cause the airflow to depart the guide vanes at a nonaxial absolute velocity $v3_5$. With second stage compressor blade $C_5$ moving at velocity $u3_5$, the relative wind speed $w3_5$ experienced by the second stage compressor blade is at an optimal angle to prevent flow separation, and more particularly, to prevent surge.

High-speed/hi-flow cases inlet airflow at absolute velocity $v1_6$ is received at first stage compressor blade $A_6$ (which is moving at velocity $u2_6$) with a relative wind speed of $w1_6$. The airflow departs the first stage compressor blade at relative wind speed $w2_6$ and an absolute velocity of $v2_6$. The compressor guide vanes $B_6$ have been actuated to a different orientation than depicted for the low-speed case ($B_5$), and cause the airflow to depart the guide vanes at an axial absolute velocity $v3_6$. With second stage compressor blade $C_6$ moving at velocity $u3_6$, the relative wind speed $w3_6$ experienced by the second stage compressor blade is at an optimal angle to maximize the choke flow rate.

With reference to FIG. 2, the compressor diffuser 239 optionally may include a plurality of either stationary or variable diffuser vanes 271. The diffuser will be designed to reduce the flow velocity and minimize total pressure losses before the flow enters the compressor volute, where the flow is collected and discharged to ducting leading to the engine. The use of variable geometry diffuser vanes provides for the stabilization of airflow in the diffuser at low flow rates, as well as for achieving maximum diffuser performance at high flow rates and pressure ratios, such as are found when operating at conditions near engine peak torque and at an engine's rated operating point.

A plurality of stationary or variable turbine nozzle vanes 273 may optionally be used between the turbine inlet volute 241 and the inducer of the first-stage, high-pressure radial turbine wheel 215. Using the variable turbine nozzle vanes and the turbine stator vanes, the rotation rates of the two rotors may be accurately controlled. Thus, different compressor speed combinations can be used to achieve a given boost level, and different levels of turbine efficiency, and therefore different overall turbine pressure ratios may be achieved by using the variable geometry provided by the turbine stator vanes and variable turbine vanes. Preferably, the turbine pressure ratio (or engine back-pressure relative to the compressor pressure ratio or engine inlet boost level) is controllably modulated to drive the required level of Exhaust Gas Recirculation ("EGR") at all engine operating conditions. Properly controlled, the present invention may minimize engine pumping losses, reduce fuel consumption and provide a required level of EGR to meet emissions regulations.

The operation of the turbocharger, and particularly, the geometry of all variable geometry vanes, is controlled by an engine control unit ("ECU") that is configured as a controller for controlling the operation of the turbocharger, such as to provide for adequate compressor pressure ratio, adequate transient response time, adequate turbine pressure ratio, minimized engine pumping losses, and minimized fuel consumption. More particularly, the control system will precisely control the delivery of air to the engine over the full range of operating conditions by controlling the variable geometry compressor-connection vanes with the objectives of maintaining stable compressor operation, maximizing compressor efficiency and maintaining the speed of the two rotors within specified safe speed limits. The control system will control the variable geometry diffuser vanes with the objectives of stabilization of airflow in the diffuser at low flow rates, and achieving maximum diffuser performance at high flow rates and pressure ratios. The speed for each compressor will be precisely controlled by modulation of the turbine-connection stator vanes 263 and/or the variable turbine nozzle vanes 273.

In construction, each of the two compressor wheels are fabricated from castable aluminum alloy using conventional tooling and casting processes for turbocharger compressors. For some high pressure-ratio applications, the second stage compressor wheel might be made from titanium, such as to better take advantage of the increased intake air density provided by the first stage compressor. The compressor wheels are attached to their respective shafts using a threaded joint or other suitable attachment for shaft-wheel assemblies.

Each of the two turbine wheels are fabricated from a nickel based super-alloy using conventional tooling and casting processes. The turbine wheels are permanently attached to their respective shafts, either by inertia welding, e-beam welding, or other suitable attachment means.

It is to be understood that the invention further comprises related apparatus and methods for designing turbocharger systems and for producing turbocharger systems, as well as the apparatus and methods of the turbocharger systems themselves. In short, the above disclosed features can be combined in a wide variety of configurations within the anticipated scope of the invention.

While particular forms of the invention have been illustrated and described, it will be apparent that various modifications can be made without departing from the spirit and scope of the invention. Fore example, for various aspects of the invention, any or all of the compressor and turbine wheels could be altered in type (e.g., between axial and radial), and all combinations within the scope of the claims below are envisioned. Thus, although the invention has been described in detail with reference only to the preferred embodiments, those having ordinary skill in the art will appreciate that various modifications can be made without departing from the scope of the invention. Accordingly, the invention is not intended to be limited by the above discussion, and is defined with reference to the following claims.

What is claimed is:

1. A turbocharger, comprising:
   a housing;
   a first compressor wheel and a first turbine wheel mounted on a first shaft supported by the housing;
   a second compressor wheel and a second turbine wheel mounted on a second shaft supported by the housing, wherein the first and the second shafts extend concentrically to define an axial direction, and wherein the housing defines a fully enclosed axial duct, through which all air flows from the first compressor wheel to the second compressor wheel, extending axially between the first and second compressor wheels; and
   a plurality of compressor guide vanes extending through the axial duct intermediate the first and second compressor wheels;
   wherein the first compressor wheel is an axial compressor wheel configured to direct airflow axially through the axial duct toward the second compressor wheel.

2. The turbocharger of claim 1, wherein one of the first and the second shafts concentrically extends through the other.

3. The turbocharger of claim 2, wherein the second compressor wheel is a radial compressor wheel.

4. The turbocharger of claim 3, wherein the compressor guide vanes are configured to be controllably positioned at a plurality of angles, and further comprising a control system configured to control the angle of the compressor guide vanes such that at low speeds the compressor guide vanes direct airflow into the second compressor wheel in a swirling direction compatible with a blade angle of the second stage compressor blades, and at high speeds the compressor guide vanes direct airflow into the second compressor wheel in an axial or near-axial direction.

5. The turbocharger of claim 1, wherein the compressor guide vanes are configured to be controllably positioned at a plurality of angles, and further comprising a control system configured to control the angle of the compressor guide vanes such that at low speeds the compressor guide vanes direct airflow into the second compressor wheel in a swirling direction compatible with a blade angle of the second stage compressor blades, and at high speeds the compressor guide vanes direct airflow into the second compressor wheel in an axial or near-axial direction.

6. The turbocharger of claim 1, wherein:
   wherein the housing defines a second axial duct extending between the first and second turbine wheels; and
   the second turbine wheel is a radial turbine wheel configured to direct airflow axially through the second axial duct toward the first turbine wheel.

7. The turbocharger of claim 6, wherein the first turbine wheel is an axial turbine wheel.

8. The turbocharger of claim 6, and further comprising a plurality of turbine stator vanes extending through the second axial duct intermediate the first and second turbine wheels.

9. The turbocharger of claim 8, wherein the plurality of compressor guide vanes and the plurality of turbine stator vanes are each configured to be controllably positioned at a plurality of angles, and further comprising a control system configured to control the angles of the plurality of compressor guide vanes such that at low speeds the compressor guide vanes direct airflow into the second compressor wheel in a swirling direction compatible with a blade angle of the second stage compressor blades, and at high speeds the compressor guide vanes direct airflow into the second compressor wheel in an axial or near-axial direction, and configured to control the speeds of the turbine wheels by controlling the angles of the plurality of turbine stator vanes.

10. The turbocharger of claim 1, and further comprising:
    a plurality of compressor guide vanes;
    a plurality of turbine stator vanes that are configured to be controllably positioned at a plurality of angles;
    a plurality of turbine nozzle vanes upstream of the second turbine wheel, and
    a control system;
    wherein the first turbine wheel is an axial turbine wheel;
    wherein the second compressor wheel is a radial compressor wheel;
    wherein the second turbine wheel is a radial turbine wheel;
    wherein the first shaft concentrically extends through the second shaft;
    wherein the housing defines a second axial duct extending between the first and second turbine wheels;
    wherein the second turbine wheel is configured to direct airflow axially through the second axial duct toward the first turbine wheel;
    wherein the plurality of turbine stator vanes extending through the second axial duct intermediate the first and second turbine wheels;

wherein the plurality of compressor guide vanes and the plurality of turbine stator vanes are each configured to be controllably positioned at a plurality of angles;

wherein the control system configured to control the angles of the plurality of compressor guide vanes such that at low speeds the compressor guide vanes direct airflow into the second compressor wheel in a swirling direction compatible with a blade angle of the second stage compressor blades, and at high speeds the compressor guide vanes direct airflow into the second compressor wheel in an axial or near-axial direction, and configured to control the speeds of the turbine wheels by controlling the angles of the plurality of turbine stator vanes; and wherein the turbine nozzle vanes are configured to be controllably positioned at a plurality of angles, wherein the control system is configured to independently control the speed of each turbine wheel by controlling the angles of the turbine stator vanes and the turbine nozzle vanes.

11. A turbocharger, comprising:

a housing;

a first compressor wheel and a first turbine wheel mounted on a first shaft supported by the housing;

a second compressor wheel and a second turbine wheel mounted on a second shaft supported by the housing, wherein the first and the second shafts extend concentrically to define an axial direction, and wherein the housing defines a duct extending axially between the first and second turbine wheels;

a control system;

a plurality of turbine stator vanes extending through the axial duct intermediate the first and second turbine wheels, the turbine stator vanes being configured to be controllably positioned at a plurality of angles; and a plurality of turbine nozzle vanes upstream of the second turbine wheel, wherein the turbine nozzle vanes are configured to be controllably positioned at a plurality of angles, wherein the control system is configured to independently control the speed of each turbine wheel by controlling the angles of the turbine stator vanes and the turbine nozzle vanes;

wherein the second turbine wheel is a radial turbine wheel configured to direct airflow axially through the axial duct toward the first turbine wheel; and;

wherein one of the first and the second shafts concentrically extends through the other.

12. The turbocharger of claim 11, wherein the first turbine wheel is an axial turbine wheel.

13. The turbocharger of claim 12, and further comprising a control system configured to control the relative speeds of the turbine wheels by controlling the angle of the turbine stator vanes.

14. The turbocharger of claim 11, and further comprising a control system configured to control the relative speeds of the turbine wheels by controlling the angle of the turbine stator vanes.

15. A method for controlling a turbocharger that includes a first compressor wheel and a first turbine wheel mounted on a first shaft supported by a housing, a second compressor wheel and a second turbine wheel mounted on a second shaft supported by the housing, and a plurality of compressor guide vanes, wherein the housing defines a fully enclosed duct, through which all air flows from the first compressor wheel to the second compressor wheel, extending between the first and second compressor wheels, and wherein the compressor guide vanes extend through the duct intermediate the first and second compressor wheels, comprising:

actuating the plurality of compressor guide vanes through a plurality of positions, the positions being configured such that at low speeds the compressor guide vanes direct airflow into the second compressor wheel in a swirling direction compatible with a blade angle of the second stage compressor blades, and at high speeds the compressor guide vanes direct airflow into the second compressor wheel in an axial or near-axial direction.

16. A control system for controlling a turbocharger that includes a first compressor wheel and a first turbine wheel mounted on a first shaft supported by a housing, a second compressor wheel and a second turbine wheel mounted on a second shaft supported by the housing, a plurality of compressor guide vanes, and an actuator, wherein the housing defines a fully enclosed duct, through which all air flows from the first compressor wheel to the second compressor wheel, extending between the first and second compressor wheels, wherein the compressor guide vanes extend through the duct intermediate the first and second compressor wheels, and wherein the actuator is configured to actuate the plurality of guide vanes through a plurality of positions, comprising:

a processing unit configured to transmit signals to the actuator such that the actuator actuates the plurality of compressor guide vanes through a selection of the plurality of positions, the selection of the plurality of positions being configured such that at low speeds the compressor guide vanes direct airflow into the second compressor wheel in a swirling direction compatible with a blade angle of the second stage compressor blades, and at high speeds the compressor guide vanes direct airflow into the second compressor wheel in an axial or near-axial direction.

17. The method of claim 15, wherein the turbocharger further includes a plurality of turbine stator vanes, wherein the housing defines a second duct extending between the first and second turbine wheels, and wherein the turbine stator vanes extend through the second duct intermediate the first and second turbine wheels, and further comprising:

controlling the relative speeds of the turbine wheels by controlling the angles of the plurality of turbine stator vanes.

18. The control system of claim 16, wherein the turbocharger further includes a plurality of turbine stator vanes and a second actuator configured to actuate the plurality of turbine stator vanes through a plurality of positions, wherein the housing defines a second duct extending between the first and second turbine wheels, and wherein the turbine stator vanes extend through the second duct intermediate the first and second turbine wheels, wherein:

the processing unit is further configured to control the relative speeds of the turbine wheels to desired speeds by transmitting signals to the second actuator such that the angles of the plurality of turbine stator vanes cause the turbine wheels to rotate at the desired speeds.

19. A control system for controlling a turbocharger for an engine, the turbocharger including a housing, a first rotor including a first compressor wheel and a first turbine wheel mounted on a first shaft, a second rotor including a second compressor wheel and a second turbine wheel mounted on a second shaft, a plurality of turbine stator vanes, and an actuator, wherein the first rotor has a significantly lower inertia than the second rotor, wherein the first and second shafts are supported by and concentrically coextend within the housing, wherein the housing defines a duct extending between the first and second turbine wheels, wherein the turbine stator vanes extend through the duct intermediate the first and second turbine wheels, and wherein the actuator is configured to actuate the plurality of stator vanes through a plurality of positions, comprising:

a processing unit configured to transmit signals to the actuator such that the actuator actuates the plurality of turbine stator vanes through the plurality of positions to control the relative rotation rates of the turbines according to operating conditions of the engine;

wherein the processing unit is configured to transmit signals to initially increase the rotation rate of the first turbine wheel relative to the second turbine wheel upon engine acceleration.

20. The control system of claim 19, wherein the processing unit is configured to transmit signals to increase the rotation rate of the second turbine wheel relative to the first turbine wheel upon operating conditions reaching high speeds.

21. The control system of claim 20, wherein the processing unit is configured to transmit signals that modulate the engine back-pressure relative to the engine inlet boost level such that the required level of Exhaust Gas Recirculation is driven at all engine operating conditions.

22. The turbocharger of claim 1, and further comprising:

a plurality of turbine stator vanes extending through an axial duct intermediate the first and second turbine wheels, the turbine stator vanes being configured to be controllably positioned at a plurality of angles; and a plurality of turbine nozzle vanes upstream of the second turbine wheel, the turbine nozzle vanes being configured to be controllably positioned at a plurality of angles;

wherein the control system is configured to independently control the speed of each turbine wheel by controlling the angles of the turbine stator vanes and the turbine nozzle vanes.

23. The turbocharger of claim 1, and further comprising:

a plurality of turbine stator vanes extending through an axial duct intermediate the first and second turbine wheels, the turbine stator vanes being configured to be controllably positioned at a plurality of angles;

a plurality of turbine nozzle vanes upstream of the second turbine wheel, the turbine nozzle vanes being configured to be controllably positioned at a plurality of angles; and a processing unit configured to transmit signals to the actuator such that the actuator actuates the plurality of turbine stator vanes through the plurality of positions to control the relative rotation rates of the turbines according to operating conditions of the engine;

wherein the first rotor has a significantly lower inertia than the second rotor; and wherein the processing unit is configured to transmit signals to initially increase the rotation rate of the first turbine wheel relative to the second turbine wheel upon engine acceleration.

24. The turbocharger of claim 23, wherein the control system is configured to independently control the speed of each turbine wheel by controlling the angles of the turbine stator vanes and the turbine nozzle vanes.

25. The method of claim 15, wherein the turbocharger further includes a plurality of turbine stator vanes extending through an axial duct intermediate the first and second turbine wheels, the turbine stator vanes being configured to be controllably positioned at a plurality of angles, and a plurality of turbine nozzle vanes upstream of the second turbine wheel, the turbine nozzle vanes being configured to be controllably positioned at a plurality of angles, and further comprising:

actuating the plurality of turbine stator vanes and the plurality of turbine nozzle vanes through a plurality of positions, the positions being configured to independently control the speed of each turbine wheel.

26. The method of claim 15, wherein the turbocharger further includes a plurality of turbine stator vanes extending through an axial duct intermediate the first and second turbine wheels, the turbine stator vanes being configured to be controllably positioned at a plurality of angles, a plurality of turbine nozzle vanes upstream of the second turbine wheel, the turbine nozzle vanes being configured to be controllably positioned at a plurality of angles; and wherein the first rotor has a significantly lower inertia than the second rotor, and further comprising:

actuating the plurality of turbine stator vanes and the plurality of turbine nozzle vanes through a plurality of positions, the positions being configured to transmit signals to initially increase the rotation rate of the first turbine wheel relative to the second turbine wheel upon engine acceleration.

27. The turbocharger of claim 26, sending control signals to actuators configured to actuate the plurality of turbine stator vanes and the plurality of turbine nozzle vanes through a plurality of positions, the positions being selected to independently control the speed of each turbine wheel.

28. The control system of claim 16, wherein the turbocharger further includes a plurality of turbine stator vanes extending through an axial duct intermediate the first and second turbine wheels, the turbine stator vanes being configured to be controllably positioned at a plurality of angles, and a plurality of turbine nozzle vanes upstream of the second turbine wheel, the turbine nozzle vanes being configured to be controllably positioned at a plurality of angles, wherein:

the processing unit is further configured to actuate the plurality of turbine stator vanes and the plurality of turbine nozzle vanes through a plurality of positions, the positions being configured to independently control the speed of each turbine wheel.

29. The control system of claim 16, wherein the turbocharger further includes a plurality of turbine stator vanes extending through an axial duct intermediate the first and second turbine wheels, the turbine stator vanes being configured to be controllably positioned at a plurality of angles, a plurality of turbine nozzle vanes upstream of the second turbine wheel, the turbine nozzle vanes being configured to be controllably positioned at a plurality of angles; and wherein the first rotor has a significantly lower inertia than the second rotor, wherein:

the processing unit is further configured to actuate the plurality of turbine stator vanes and the plurality of turbine nozzle vanes through a plurality of positions, the positions being configured to initially increase the rotation rate of the first turbine wheel relative to the second turbine wheel upon engine acceleration.

30. The control system of claim 29, the processing unit is further configured to actuate the plurality of turbine stator vanes and the plurality of turbine nozzle vanes through a plurality of positions, the positions being configured to independently control the speed of each turbine wheel.

31. The turbocharger of claim 11, wherein:

the control system is configured to control the angles of the turbine stator vanes and the turbine nozzle vanes through the plurality of positions to control the rotation rates of the turbines according to operating conditions of the engine;

the first rotor has a significantly lower inertia than the second rotor; and the control system is configured to control the angles of the turbine stator vanes and the turbine nozzle vanes such that they initially increase the rotation rate of the first turbine wheel relative to the second turbine wheel upon engine acceleration.

32. A control system for controlling a turbocharger that includes a first compressor wheel and a first turbine wheel mounted on a first shaft supported by a housing, a second compressor wheel and a second turbine wheel mounted on a second shaft supported by the housing, a plurality of turbine stator vanes extending through an axial duct intermediate the first and second turbine wheels, the turbine stator vanes being configured to be controllably positioned at a plurality of angles, and a plurality of turbine nozzle vanes upstream of the second turbine wheel, the turbine nozzle vanes being configured to be controllably positioned at a plurality of angles, comprising:

a processing unit configured to actuate the plurality of turbine stator vanes and the plurality of turbine nozzle vanes through a plurality of positions, the positions being configured to independently control the speed of each turbine wheel.

33. The control system of claim 32, wherein the first rotor has a significantly lower inertia than the second rotor, wherein:

the processing unit is further configured to actuate the plurality of turbine stator vanes and the plurality of turbine nozzle vanes such that they initially increase the rotation rate of the first turbine wheel relative to the second turbine wheel upon engine acceleration.

34. A turbocharger, comprising:

a housing;

a first compressor wheel and a first turbine wheel mounted on a first shaft supported by the housing;

a second compressor wheel and a second turbine wheel mounted on a second shaft supported by the housing, wherein the first and the second shafts extend concentrically through one another to define an axial direction, and wherein the housing defines a duct extending axially between the first and second turbine wheels;

a plurality of turbine stator vanes extending through the axial duct intermediate the first and second turbine wheels, the turbine stator vanes being configured to be controllably positioned at a plurality of angles;

a plurality of turbine nozzle vanes upstream of the second turbine wheel, wherein the turbine nozzle vanes are configured to be controllably positioned at a plurality of angles; and a control system configured to controllably position the plurality of turbine stator vanes and the plurality of turbine nozzle vanes through their pluralities of positions to control the relative rotation rates of the turbines according to operating conditions of the engine;

wherein the first rotor has a significantly lower inertia than the second rotor; and wherein the control system is further configured to controllably position the plurality of turbine stator vanes and the plurality of turbine nozzle vanes to initially increase the rotation rate of the first turbine wheel relative to the second turbine wheel upon engine acceleration.

* * * * *